(No Model.)

A. J. DANNER.

NUT LOCK.

No. 274,285. Patented Mar. 20, 1883.

Witnesses.
W. J. Osgood
P. Printz

Inventor
Abraham J. Danner
by H. A. Snow
Att'y

UNITED STATES PATENT OFFICE.

ABRAHAM J. DANNER, OF BOTETOURT SPRINGS, VIRGINIA.

NUT-LOCK.

SPECIFICATION forming part of Letters Patent No. 274,285, dated March 20, 1883.

Application filed January 26, 1883. (No model.)

*To all whom it may concern:*

Be it known that I, ABRAHAM J. DANNER, a citizen of the United States, residing at Botetourt Springs, in the county of Roanoke and State of Virginia, have invented certain new and useful Improvements in Nut-Locks, of which the following is a specification, reference being had therein to the accompanying drawings.

This invention relates to improvements in nut-locks; and it consists in the construction and arrangement of the several parts, as will be hereinafter fully described, and specifically pointed out in the claims.

Figure 1:
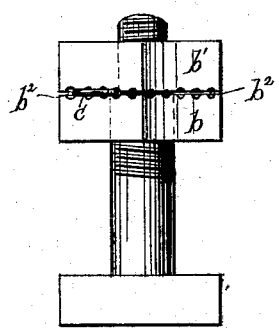
Figure 2:
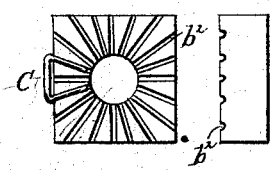
Figure 3:
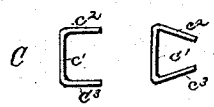
Figure 4:
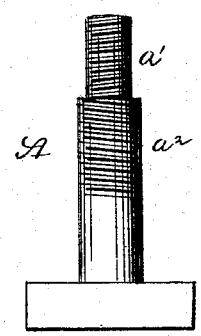

In the drawings, Figure 1 is a side view of a bolt having a nut-lock thereon. Fig. 2 shows the nut, Fig. 3 the locking-bar, and Fig. 4 the bolt, all of which will be described.

$a$ is the bolt having the right-hand thread $a'$ and the left-hand thread $a^2$ cut thereon, as shown. The portion $a^2$ is made of a larger diameter than the portion $a'$, as shown, so the nut may be slipped down over portion $a'$ and turned on portion $a^2$, as will be described.

$b$ is the main nut, and $b'$ is the jam-nut. The former is tapped to turn on portion $a^2$ of the bolt and the latter on the portion $a'$, as shown. These nuts $b\ b'$ are provided on their adjoining faces with grooves $b^2$, made approximately semicircular in cross-section, and which radiate from the center of the nuts, as shown in Fig. 2.

$c$ is the locking-rod, bent to form the arms $c'$, $c^2$, $c^3$, as shown. When the rod is in its normal position the arms $c^2\ c^3$ stand at right angles to the arm $c'$.

In operation the nut $b$ is turned on portion $a^2$ to point desired, and the nut $b'$ is then turned down on portion $a'$ till it is close to the nut $b$ and the grooves $b^2$ in the faces of the nuts are coincident. The ends of the rod $c$ are then applied to the outer openings of these grooves and the rod is driven in, the arms following the radial incline of the grooves, as shown in Fig. 2, and locking the two nuts together, as shown in Fig. 1, so that as they are on threads of opposite inclinations they cannot turn in either direction. When it is desired to unlock the nuts the rod $c$ may be withdrawn.

By the described construction a simple, efficient, and economical nut-lock is obtained free from springs or considerable complications.

It will be understood that the grooves $b^2$, instead of being radial, might be at other suitable angles to the outer edge of the nut, the object being to make the grooves at angles other than right angles, so the locking-rod will be retained in place. I prefer the grooves radial, as shown, however, as they are more readily formed, and then when so arranged guide the locking-rod more easily into place.

What I claim is—

1. In combination, a bolt cut with right and left hand threads, nuts constructed to turn relatively on these right and left hand threads and provided with grooves on their adjoining faces, the said grooves being inclined substantially as described, and rods having arms adapted to be forced in the grooves in the adjoining faces of the nuts, as specified.

2. The combination of the bolt cut with right and left hand threads, the nuts having grooves cut on their adjoining faces and radiating as described, and locking-rods having arms adapted to be forced in the said grooves, substantially as described and shown, and for the purposes set forth.

In testimony whereof I affix my signature in presence of two witnesses.

ABRAHAM J. DANNER.

Witnesses:
P. PRINTZ,
W. J. OSGOOD.